A. J. FORTESCUE.
AERIAL MACHINE.
APPLICATION FILED MAR. 29, 1917.

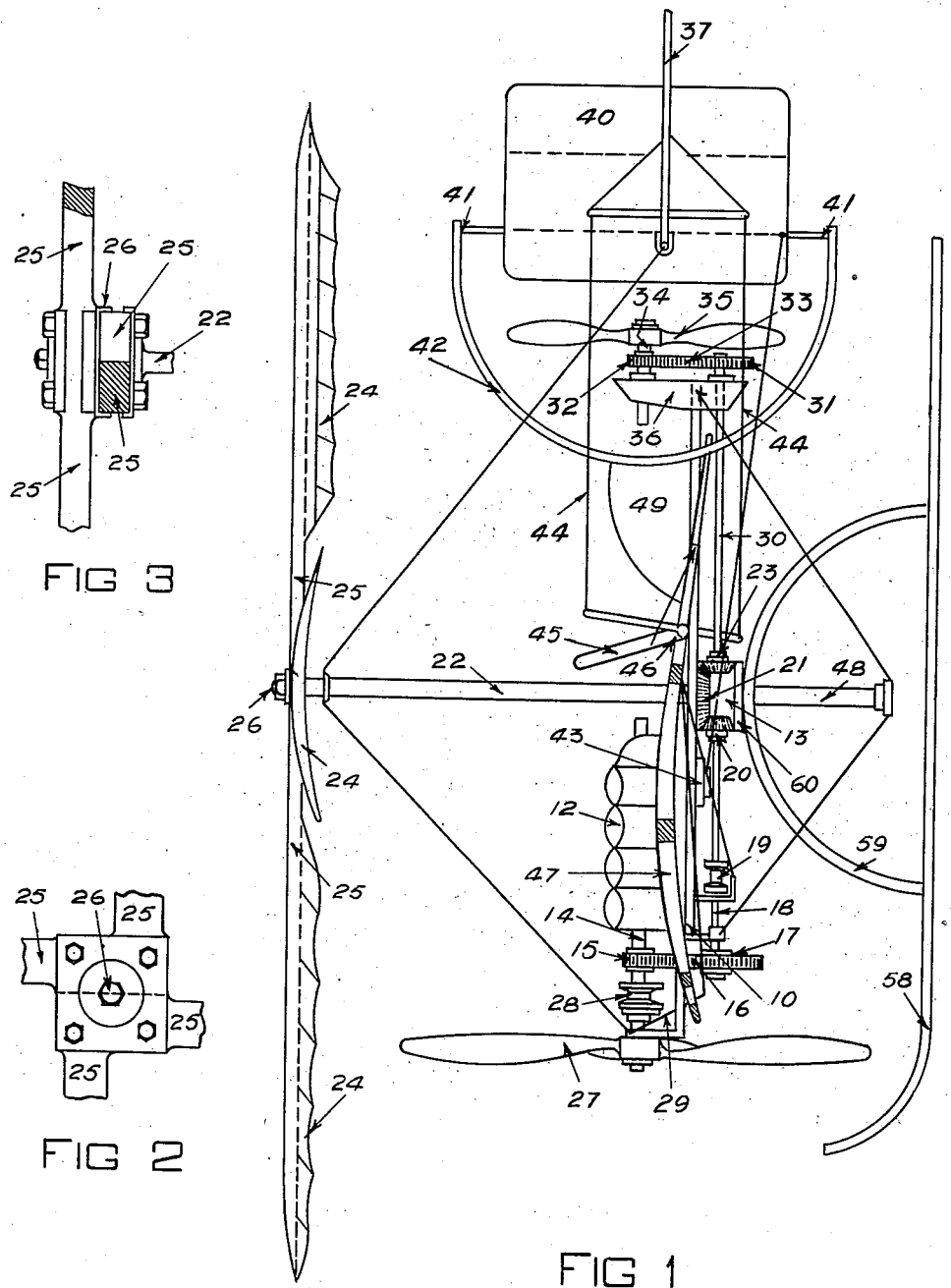

1,290,831.

Patented Jan. 7, 1919.
3 SHEETS—SHEET 3.

Witnesses:

Inventor
Albert J. Fortescue
by
Attorney

UNITED STATES PATENT OFFICE.

ALBERT JOHN FORTESCUE, OF ARNCLIFFE, NEAR SYDNEY, NEW SOUTH WALES, AUSTRALIA.

AERIAL MACHINE.

1,290,831.   Specification of Letters Patent.   Patented Jan. 7, 1919.

Application filed March 29, 1917. Serial No. 158,431.

*To all whom it may concern:*

Be it known that I, ALBERT JOHN FORTESCUE, a subject of the King of Great Britain, residing at Arncliffe, near Sydney, in the State of New South Wales, Commonwealth of Australia, have invented certain new and useful Improvements in Aerial Machines, of which the following is a specification.

This invention relates to improvements in aerial machines of the heavier than air type and has for its main object the construction of a machine which will be capable of ascending or descending under control at a steeper angle than machines heretofore constructed. A further object is to enable the machine to be changed from a high speed to a low speed or vice versa when desired without manipulating the engine throttle, the low speed if necessary approximating to poising of the machine. An important advantage of my machine is that owing to the comparatively small size of its non rotating parts it will be practically invisible from the ground when at an altitude where existing machines are visible, especially if it is suitably colored and the fixed planes are of comparatively small area.

According to the invention the fuselage or frame of the machine carries at about the center of balance an upwardly extending rotatable vertical shaft having secured at its upper end planes or propeller blades of comparatively large area to those used for horizontal propulsive means. This shaft may be driven independently of the main horizontal propulsive means and its planes or blades are placed so as to be clear of the fixed planes but preferably said shaft is driven from the main engine shaft by suitable gearing or by an auxiliary engine. The object of the revolving planes or blades is to facilitate the rising of the machine and the retardation of its descent insuring also greater internal dynamic stability. The preferred means for propelling the machine horizontally is a tractor propeller driven from the main engine shaft preferably through a clutch or gearing under the control of the pilot or it may be driven by an independent engine.

In order to counteract any screwing movement of the machine due to the horizontally rotating planes and control its direction I provide adjacent to the rear of the fuselage or frame another propeller which forces air against and past a movable surface or surfaces which are adjustable to different angles as desired by means of controls operated by the pilot or by giving one of the fixed planes more drag than the other. When the speed of the tractor is reduced or stopped the revolving planes and rear propeller still operate, the latter for some horizontal propulsion and to force air against and past the movable surfaces for controlling purposes.

I may in some cases dispense with the horizontal rotating planes.

But in order that the invention may be readily understood, reference will now be made to the accompanying drawings, wherein, Figure 1 is a side elevation partly in section of a machine illustrating the preferred embodiment of the invention.

Figs. 2 and 3 are details illustrating a manner of securing the planes or blades on the rotatable vertical shaft.

Figure 4:
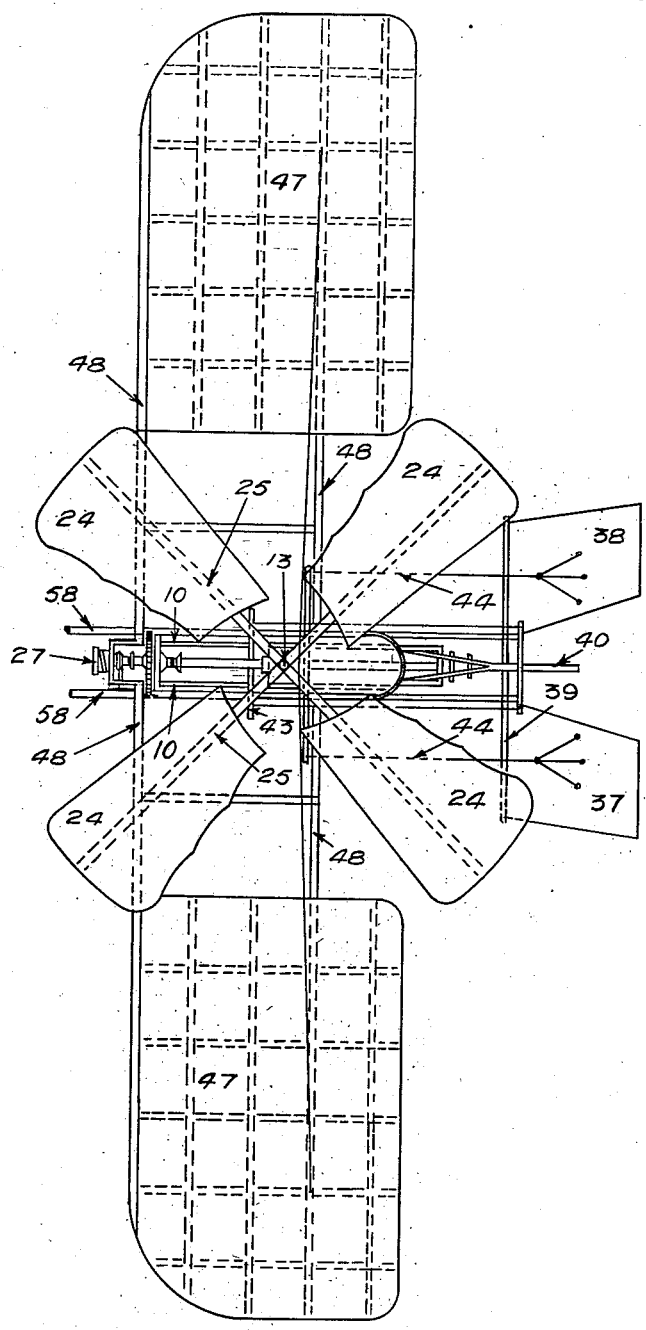
Fig. 4 is a plan of the machine on a slightly smaller scale than Fig. 1, the engine not being shown.
Figure 5:
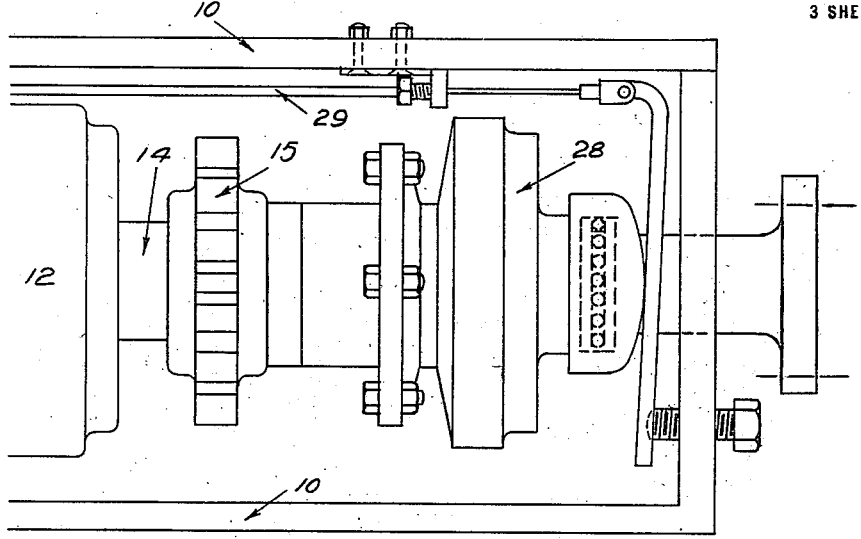
Fig. 5 is an enlarged detail illustrating the clutch gear.
Figure 6:
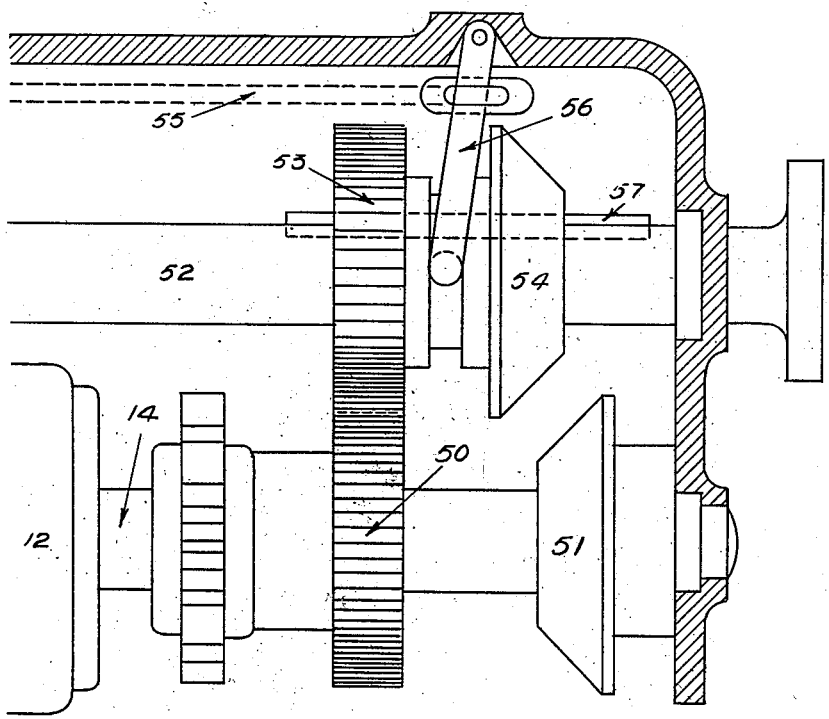

Fig. 6 a modification thereof.

The same numerals indicate the same or like parts.

The fuselage or body comprises bearers or longitudinal members 10 held together at intervals by transverse members the bearers converging toward the rear. On this frame is bolted the engine 12 and gear box 13. The engine shaft 14 has keyed thereto the sprocket wheel 15 which drives through the chain 16, sprocket 17, and the shaft 18. This shaft 18 which preferably has a clutch or change speed gear 19 to facilitate starting under the control of the pilot transmits through the gear wheels 20 and 21 in the gear box 13 rotation to the vertical shaft 22 which is positioned at about the center of balance, the shafting being preferably incased in steel tubing fitted with ball bearings and suitably stayed. The shaft 22 carries the rotatable planes or blades 24 which are fastened toward the outer ends of arms 25 the inner ends of which are secured on the shaft preferably in a cap or plates 26 keyed or bolted on the upper end of the shaft as shown in Figs. 2 and 3. The planes 24 are preferably built up and covered with fabric or sheet metal having an uncovered space near the center. These planes are rotated at a low speed comparatively with the revolutions of the blades of the tractor 27 or propeller 35 when in normal flight. The tractor is secured to the engine shaft 14 on which is the clutch 28 operated by a flexible wire 29 or other motion transmitting mechanism.

The bevel toothed wheel 21 in the gear box also transmits motion through a bevel wheel 23 to the shaft 30 which rotates through the sprockets 31 and 32 and chain 33 the countershaft 34 on which is the small propeller 35 said shafts having bearing in the bracket 36 bolted to the frame. At the rear of the propeller 35 are the controlling or elevating surfaces 37 and 38 mounted on the partly rotatable transverse rod 39, also the rudder 40 supported in bearings 41 on the frame 42. The rudder 40 is operated by the pilot through the foot control lever 43 and connecting wires. The angle of the elevating surfaces 37 and 38 is controlled by the pilot through the hand lever 45 and wires 44 said lever being capable of movement in either direction longitudinally to operate the elevating surfaces 37 and 38 and is also movable laterally on its fulcrum 46. The object of this lateral movement is to control in the usual manner the angle of the fixed planes 47 which are supported on the arms 48 secured to the longitudinal members 10. These planes 47 are preferably set at a dihedral angle and are uncovered near the body of the machine. 48 is a wire straining post secured under the gear box plate 60 and 49 the pilot's seat which is preferably made adjustable to equalize the load when necessary.

Although shown as a monoplane the machine may be made as a biplane or other type.

In the modification illustrated in Fig 6, 50 is a gear wheel on the engine shaft 14 which also has the friction cone 51. On the shaft 52 is a corresponding gear wheel 53 capable of meshing with the wheel 50 and 54 is a friction cone capable of being brought into contact with the cone 51. On actuating the wire or rod 55 to move the pivoted arm 56 the wheel 53 and cone 54 are carried along the shaft 52 on the key 57 so that the wheel disengages with the wheel 50. If desired on further movement of the wheel 53 and cone 54 on said key the latter is brought into contact with the cone 51 so that if necessary an easy starting of the tractor may be effected by frictional contact before throwing over the clutch to cause the toothed wheels 50 and 53 to reengage.

58 represents skids having the frame 59 carrying a transverse plate 60 to support the machine.

In operating the machine, the tractor or other propelling means before starting is preferably thrown out of gear with the engine so that rotation may be first transmitted to the horizontally rotating planes and to the rear propeller. When running well and about to rise the clutch on the engine shaft is operated to rotate the tractor to the essential speed.

When in flight, on partially or wholly disengaging the tractor by means of the clutch or change speed gear, the engine will accelerate and rotate the horizontal planes and rear propeller at a greater speed the effect of which is to keep the machine stable and controllable and permit it to fly slowly or to land at a steep angle. In descending without the engine power the rotating horizontal planes will tend to reverse causing the machine to descend spirally or it may be volplaned somewhat in the usual manner; or when descending with the engine running the tractor may be partially or wholly disengaged while the throttle of the engine may be fully open.

Having thus described my invention, what I claim as new and desire to protect by Letters Patent, is:—

1. In an aerial machine of the heavier than air type having main propelling means capable of operating at different speed ratios with respect to its driving means, a vertical shaft having means for driving it from the engine and provided with revolving supporting planes, and sustaining planes, the combination of movable surfaces the angles of which are variable by the pilot for lateral and vertical controlling purposes when the main propelling means is operating at a low speed ratio relatively to the engine speed, and a propeller arranged to direct a current of air against and past said surfaces.

2. In an aerial machine of the heavier than air type having a tractor capable of being engaged and disengaged with respect to its driving means, a rotatable vertical shaft carrying planes or blades, and lateral sustaining planes, the combination of movable surfaces the angles of which are variable by the pilot for lateral and vertical controlling purposes when the tractor is disengaged and the engine running idly, and a propeller arranged to direct a current of air against and past said surfaces.

3. In an aerial machine of the heavier than air type, the combination of a tractor driven from the engine shaft through a variable speed transmission device, a rotatable vertical shaft carrying planes or blades driven from said engine shaft by a counter shaft, lateral planes, a rear propeller adapted to discharge a strong current of air rearwardly, and movable surfaces the angles of which are variable by the pilot for lateral and vertical controlling purposes when the tractor is operating at low speed relatively to the engine speed and against and past which surfaces a current of air is directed by said rear propeller.

In testimony whereof I have hereunto set my hand in presence of two subscribing witnesses.

ALBERT JOHN FORTESCUE.

Witnesses:
CHARLES E. GRAHAM,
HENRY W. CLARKE.